United States Patent
Miyata et al.

(10) Patent No.: US 12,105,530 B2
(45) Date of Patent: Oct. 1, 2024

(54) INFORMATION PROCESSING APPARATUS AND METHOD

(71) Applicant: TOYOTA JIDOSHA KABUSHIKI KAISHA, Toyota (JP)

(72) Inventors: Ai Miyata, Okazaki (JP); Yurika Tanaka, Yokosuka (JP); Hideo Hasegawa, Nagoya (JP); Hiroyuki Suzuki, Miyoshi (JP); Katsuhiro Ohara, Nagoya (JP); Tomoya Makino, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 17/488,946

(22) Filed: Sep. 29, 2021

(65) Prior Publication Data
US 2022/0100211 A1     Mar. 31, 2022

(30) Foreign Application Priority Data
Sep. 30, 2020   (JP) ................................ 2020-166541

(51) Int. Cl.
*B64C 39/02* (2023.01)
*B64D 47/08* (2006.01)
(Continued)

(52) U.S. Cl.
CPC ........... *G05D 1/106* (2019.05); *B64C 39/024* (2013.01); *B64D 47/08* (2013.01); *G06V 20/176* (2022.01);
(Continued)

(58) Field of Classification Search
CPC .... G05D 1/106; G06V 20/176; B64C 39/024; B64D 47/08; B64U 2201/00; B64U 10/13; B64U 2101/30
See application file for complete search history.

(56) References Cited

U.S. PATENT DOCUMENTS

| | | | |
|---|---|---|---|
| 2019/0233102 A1* | 8/2019 | Kaneichi | B64C 39/024 |
| 2019/0265705 A1* | 8/2019 | Zhang | G05D 1/0088 |

(Continued)

FOREIGN PATENT DOCUMENTS

| | | | |
|---|---|---|---|
| CN | 111465556 A | | 7/2020 |
| JP | 2005018250 A | * | 1/2005 |
| JP | 2019-131332 A | | 8/2019 |

OTHER PUBLICATIONS

Machine Translation of the description of JP 2005018250 A, pp. 1-2 (Year: 2005).*

*Primary Examiner* — Anne Marie Antonucci
*Assistant Examiner* — Jared C Bean
(74) *Attorney, Agent, or Firm* — Oblon, McClelland, Maier & Neustadt, L.L.P.

(57) ABSTRACT

An information processing apparatus includes a communication interface configured to communicate with a first unmanned aircraft having a first camera to be used for detecting an obstacle and a second unmanned aircraft having a second camera to be used for detecting an obstacle with higher detection accuracy than the first camera, and a controller configured to, in a case in which a predetermined event relating to the first unmanned aircraft has occurred, detect, using the second unmanned aircraft, an obstacle at a target point on a flight path along which the first unmanned aircraft travels to a destination, and control the first unmanned aircraft to navigate around the detected obstacle using information regarding the detected obstacle.

8 Claims, 8 Drawing Sheets

(51) Int. Cl.
*G05D 1/00* (2024.01)
*G06V 20/10* (2022.01)
*B64U 10/13* (2023.01)
*B64U 101/30* (2023.01)

(52) U.S. Cl.
CPC .......... *B64U 10/13* (2023.01); *B64U 2101/30* (2023.01); *B64U 2201/00* (2023.01)

(56) References Cited

U.S. PATENT DOCUMENTS

| | | |
|---|---|---|
| 2020/0164980 A1 | 5/2020 | Sudou |
| 2021/0056859 A1* | 2/2021 | Tachiiwa ............. G08G 5/0052 |
| 2021/0208606 A1* | 7/2021 | Nakazawa ............ B64C 39/024 |
| 2021/0287559 A1* | 9/2021 | Jeong ................... G05D 1/0022 |
| 2021/0320774 A1* | 10/2021 | Park ...................... H04L 5/0053 |
| 2021/0349478 A1* | 11/2021 | Bigdeli ................ G08G 5/0069 |
| 2021/0360205 A1* | 11/2021 | Alakarhu ............... H04N 23/90 |

* cited by examiner

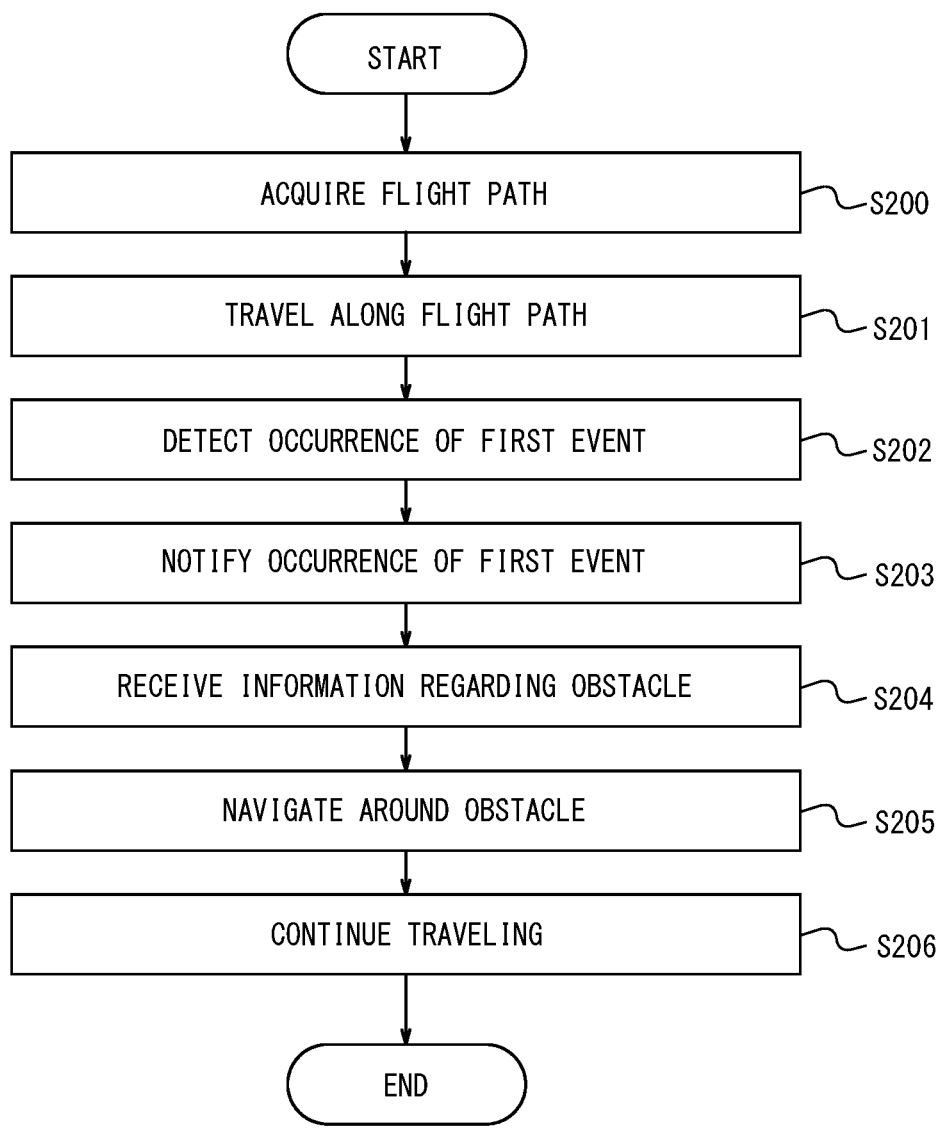

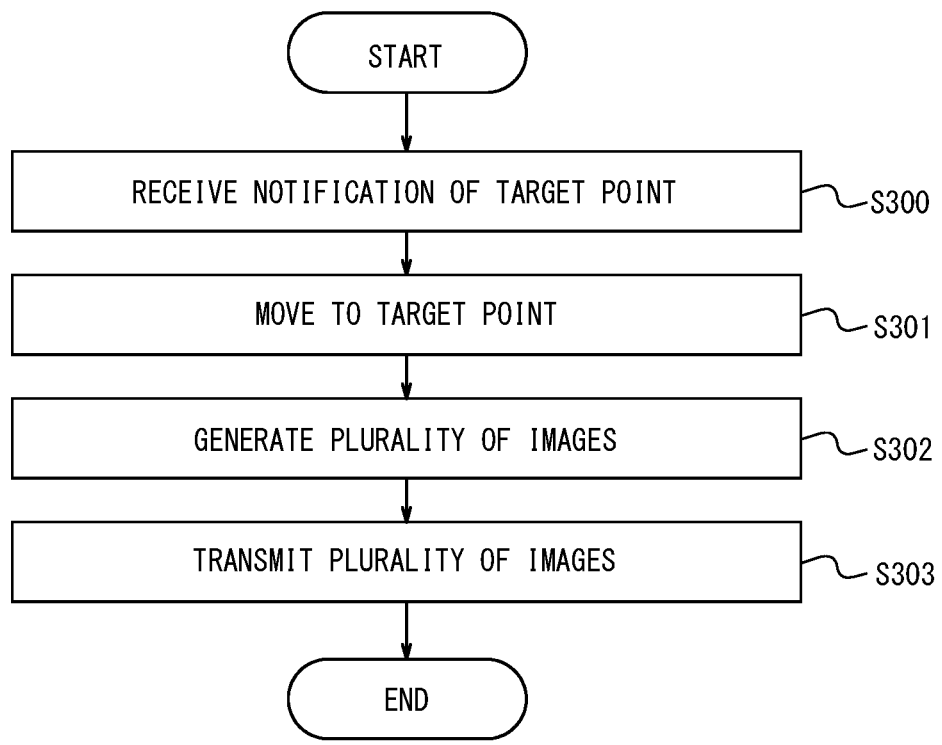

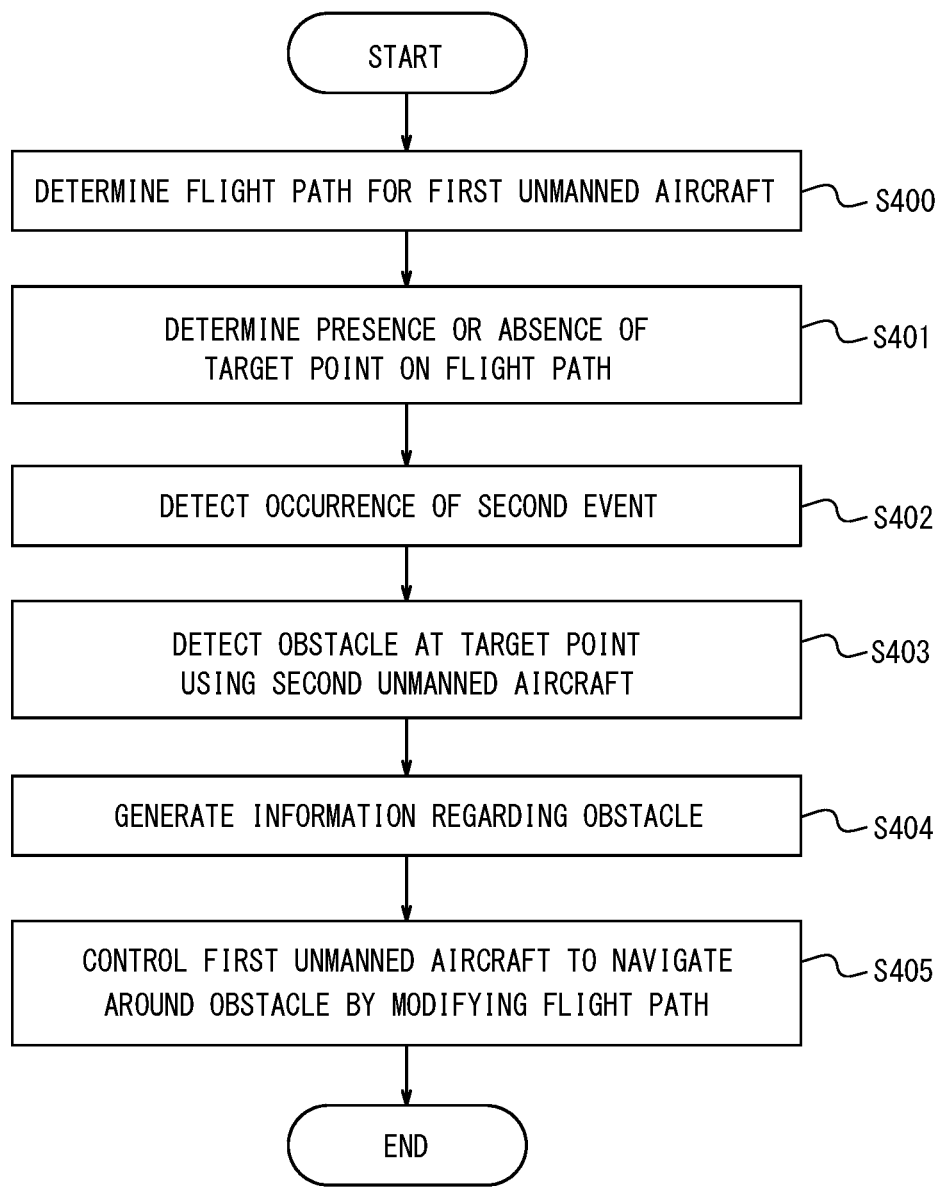

INFORMATION PROCESSING APPARATUS AND METHOD

CROSS-REFERENCE TO RELATED APPLICATION

This application claims priority to Japanese Patent Application No. 2020-166541, filed on Sep. 30, 2020, the entire contents of which are incorporated herein by reference.

TECHNICAL FIELD

The present disclosure relates to an information processing apparatus and a method.

BACKGROUND

Technology for controlling unmanned aircraft such as drones is known. For example, Patent Literature (PTL) 1 discloses a drone management system that manages drones for delivery of packages.

CITATION LIST

Patent Literature

PTL 1: JP 2019-131332 A

SUMMARY

In recent years, it is desired to control unmanned aircraft on which cameras are mounted to avoid surrounding obstacles detected using the cameras. However, depending on the performance of the cameras mounted on the unmanned aircraft, it may not be possible to detect the obstacles. Therefore, there is room for improvement with respect to technology for controlling unmanned aircraft.

It would be helpful to improve technology for controlling unmanned aircraft.

An information processing apparatus according to an embodiment of the present disclosure includes:

a communication interface configured to communicate with a first unmanned aircraft having a first camera to be used for detecting an obstacle and a second unmanned aircraft having a second camera to be used for detecting an obstacle with higher detection accuracy than the first camera; and a controller configured to, in a case in which a predetermined event relating to the first unmanned aircraft has occurred, detect, using the second unmanned aircraft, an obstacle at a target point on a flight path along which the first unmanned aircraft travels to a destination, and control the first unmanned aircraft to navigate around the detected obstacle using information regarding the detected obstacle.

A method according to an embodiment of the present disclosure is a method performed by a first unmanned aircraft equipped with a first camera to be used for detecting an obstacle, the method including:

in a case in which a first event in which the first unmanned aircraft, in course of traveling along a flight path to a destination, stops traveling to the destination has occurred, receiving information regarding an obstacle at a target point on the flight path, the obstacle being detected using a second unmanned aircraft; and navigating around the detected obstacle using the information regarding the detected obstacle, wherein the second unmanned aircraft is equipped with a second camera to be used for detecting an obstacle with higher detection accuracy than the first camera.

A method according to an embodiment of the present disclosure is a method performed by a second unmanned aircraft equipped with a second camera to be used for detecting an obstacle, the method including:

in a case in which a predetermined event relating to a first unmanned aircraft has occurred, moving to a target point notified by an information processing apparatus; and generating a plurality of images of the target point captured by the second camera, while changing a viewpoint, wherein the first unmanned aircraft is equipped with a first camera to be used for detecting an obstacle with lower detection accuracy than the second camera.

According to an embodiment of the present disclosure, technology for controlling unmanned aircraft is improved.

BRIEF DESCRIPTION OF THE DRAWINGS

In the accompanying drawings:

FIG. 7 is a flowchart illustrating operations of the first unmanned aircraft according to the first embodiment;

FIG. 8 is a flowchart illustrating operations of the second unmanned aircraft according to the first embodiment; and FIG. 9 is a flowchart illustrating operations of the information processing apparatus according to a second embodiment.

DETAILED DESCRIPTION

Hereinafter, embodiments of the present disclosure will be described.

(Outline of First Embodiment)

Figure 1:
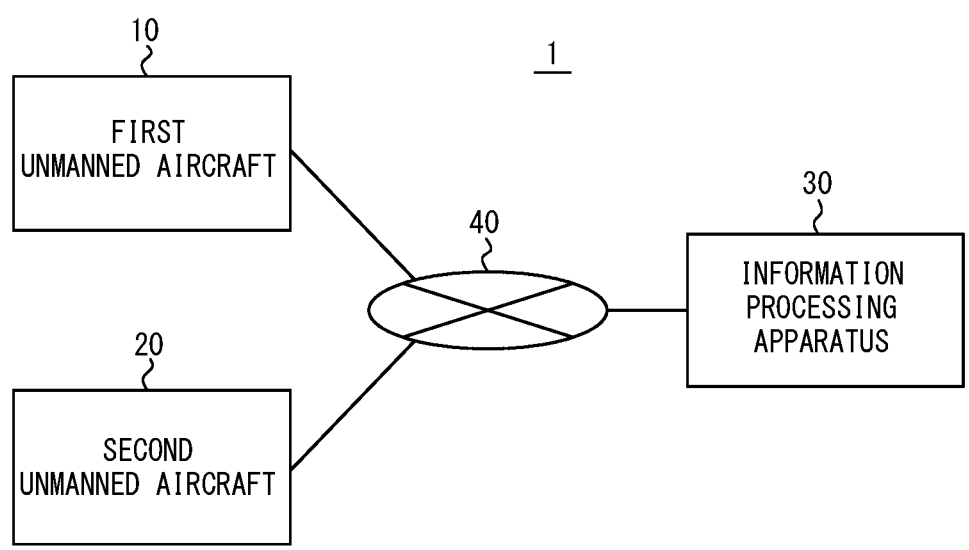
FIG. 1 is a block diagram illustrating a schematic configuration of a system according to an embodiment of the present disclosure.

An outline of a system 1 according to a first embodiment of the present disclosure will be described with reference to FIG. 1. The system 1 includes a first unmanned aircraft 10, a second unmanned aircraft 20, and an information processing apparatus 30. The number of first unmanned aircraft 10 included in the system 1 and the number of second unmanned aircraft 20 included in the system 1 may each be any number not less than one.

The first unmanned aircraft 10 is any aircraft without a person on board. For example, an aircraft such as a drone or a multicopter can be employed as the first unmanned aircraft 10. The first unmanned aircraft 10 can travel to a destination along a flight path by autonomous flight or by cooperation with the information processing apparatus 30. For example, the first unmanned aircraft 10 can navigate around obstacles detected using a camera mounted on the first unmanned aircraft 10 itself. To detect the obstacles, any image recognition method, such as template matching or machine learning, for example, can be employed. The detection of the obstacles may be performed by the first unmanned aircraft 10 alone, or by the information processing apparatus 30 upon acquisition of images from the first unmanned aircraft 10 via a network 40. In the present embodiment, the first unmanned aircraft 10 is used for logistics service to deliver a package attached to the first unmanned aircraft 10 itself to a destination. However, not limited to the logistics service, the first unmanned aircraft 10 can be used for any service in which the first unmanned aircraft 10 travels to a destination along a flight path.

The second unmanned aircraft 20 is any aircraft without a person on board. For example, an unmanned aircraft such as a drone or a multicopter can be employed as the second unmanned aircraft 20. The second unmanned aircraft 20 can move to a point notified by the information processing apparatus 30 by autonomous flight or by cooperation with the information processing apparatus 30. As described below, the second unmanned aircraft 20 is equipped with a high-performance camera that provides higher obstacle detection accuracy than the first unmanned aircraft 10. For this reason, the second unmanned aircraft 20 may detect obstacles with higher accuracy than the first unmanned aircraft 10. The detection of the obstacles may be performed by the second unmanned aircraft 20 alone, or by the information processing apparatus 30 upon acquisition of images from the second unmanned aircraft 20 via the network 40. In the present embodiment, the second unmanned aircraft 20 is used for detecting an obstacle at a target point notified by the information processing apparatus 30.

The information processing apparatus 30 is an apparatus, such as a computer or a server apparatus, having information processing function. In the present embodiment, the information processing apparatus 30 can communicate with each of the first unmanned aircraft 10 and the second unmanned aircraft 20 via the network 40 including, for example, the Internet, a mobile communication network, or the like.

First, an outline of the first embodiment will be described, and details thereof will be described later. In a case in which a predetermined event relating to the first unmanned aircraft 10 has occurred, the information processing apparatus 30 detects, using the second unmanned aircraft 20, an obstacle at a target point on a flight path along which the first unmanned aircraft 10 travels to a destination. In the first embodiment, the predetermined event is a first event in which the first unmanned aircraft 10, in course of traveling along the flight path, stops traveling to the destination. The information processing apparatus 30 controls the first unmanned aircraft 10 to navigate around the detected obstacle using information regarding the detected obstacle.

The first unmanned aircraft 10 may stop traveling to a destination, in a case in which an inconvenience such as, for example, the camera mounted on the first unmanned aircraft 10 itself being unable to accurately detect an obstacle has occurred. In contrast, according to the first embodiment, the first unmanned aircraft 10 can navigate around an obstacle detected using the second unmanned aircraft 20, using information regarding the detected obstacle, to continue traveling to the destination. This eliminates, for example, the need for mounting a high-performance camera, which provides high obstacle detection accuracy, on every first unmanned aircraft 10 for delivery of packages. In general, the higher the performance of a camera, the higher the cost or the larger the dimensions of the camera. Therefore, according to the first embodiment, technology for controlling unmanned aircraft is improved in that the first unmanned aircraft 10 can navigate around an obstacle with increased reliability while having reduced cost or size.

Next, configurations of the system 1 will be described in detail.

(Configuration of First Unmanned Aircraft)

Figure 2:
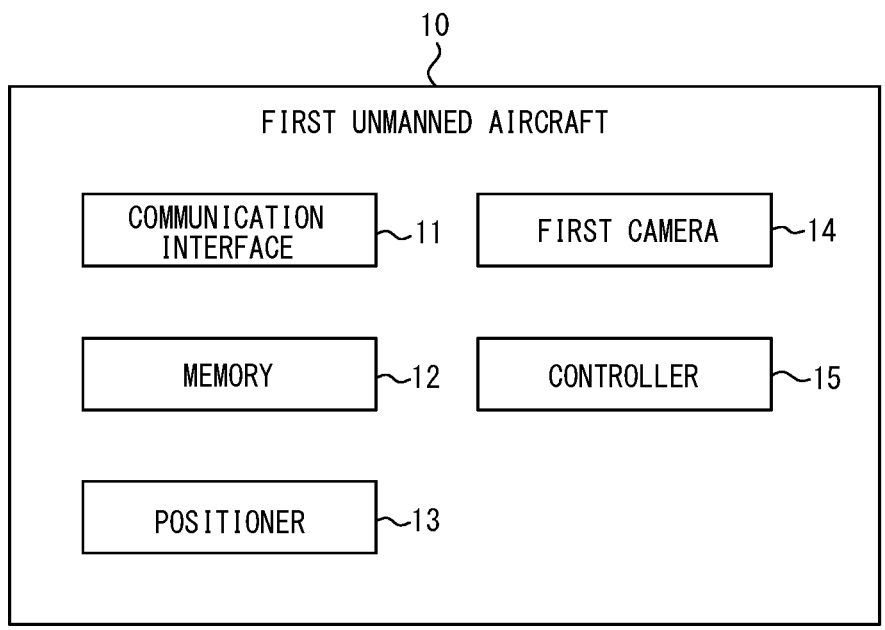
FIG. 2 is a block diagram illustrating a schematic configuration of a first unmanned aircraft.

As illustrated in FIG. 2, the first unmanned aircraft 10 includes a communication interface 11, a memory 12, a positioner 13, a first camera 14, and a controller 15.

The communication interface 11 includes at least one communication interface for connecting to the network 40. The communication interface is compliant with mobile communication standards such as the 4th generation (4G) standard and the 5th generation (5G) standard, for example, but not limited to these, and may be compliant with any communication standard. In the present embodiment, the first unmanned aircraft 10 communicates with the information processing apparatus 30 via the communication interface 11.

The memory 12 includes one or more memories. The memories are semiconductor memories, magnetic memories, optical memories, or the like, for example, but are not limited to these. The memories included in the memory 12 may each function as, for example, a main memory, an auxiliary memory, or a cache memory. The memory 12 stores any information used for operations of the first unmanned aircraft 10. For example, the memory 12 may store a system program, an application program, embedded software, and the like. The information stored in the memory 12 may be updated with, for example, information acquired from the network 40 via the communication interface 11.

The positioner 13 includes a receiver compliant with a satellite positioning system. The receiver is compliant with the Global Positioning System (GPS), for example, but is not limited to this, and may be compliant with any satellite positioning system. The positioner 13 includes, for example, a gyro sensor, a geomagnetic sensor, and a barometric pressure sensor. In the present embodiment, the first unmanned aircraft 10 can acquire, using the positioner 13, position information for the first unmanned aircraft 10 itself, a direction toward which the first unmanned aircraft 10 itself is directed, and a tilt of the first unmanned aircraft 10 itself. The position information may include two-dimensional coordinate data including latitude and longitude, or three-dimensional coordinate data including altitude, in addition to latitude and longitude.

The first camera 14 is used for detecting obstacles present around the first unmanned aircraft 10. As the first camera 14, for example, a camera having a certain angle of view or an omnidirectional camera can be employed. In the present embodiment, the first unmanned aircraft 10 can navigate around the obstacles detected using the first camera 14. The first camera 14 may be a camera that provides lower obstacle detection accuracy than a second camera 24 mounted on the second unmanned aircraft 20, as described below. Specifically, the first camera 14 may have, for example, a lower resolution, a smaller image sensor, a larger f-number for lenses, or a smaller number of lenses than the second camera 24 mounted on the second unmanned aircraft 20. In a case in which the second camera 24 mounted on the second unmanned aircraft 20 is equipped with a complementary metal oxide semiconductor (CMOS) image sensor, the first camera 14 may be equipped with a charge coupled device (CCD) image sensor.

The controller 15 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 15 controls the operations of the entire first unmanned aircraft 10. Details of the operations of the first unmanned aircraft 10 controlled by the controller 15 will be described later.

(Configuration of Second Unmanned Aircraft)

Figure 3:
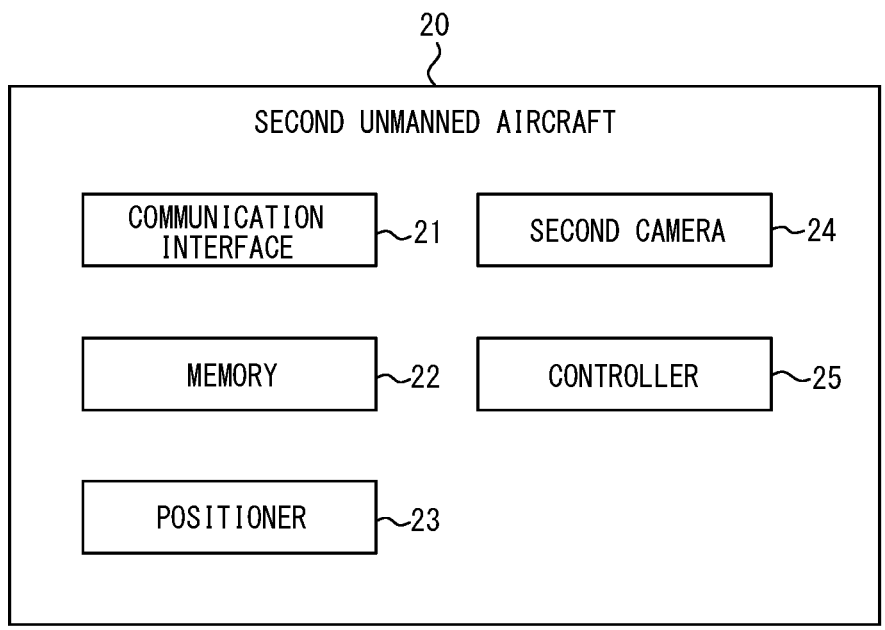
FIG. 3 is a block diagram illustrating a schematic configuration of a second unmanned aircraft.

As illustrated in FIG. 3, the second unmanned aircraft 20 includes a communication interface 21, a memory 22, a positioner 23, a second camera 24, and a controller 25. The hardware configurations of the communication interface 21, the memory 22, the positioner 23, and the controller 25 are the same as those of the communication interface 11, the memory 12, the positioner 13, and the controller 15 of the first unmanned aircraft 10, respectively, and thus descriptions thereof are omitted.

The second camera 24 is used for detecting obstacles present around the second unmanned aircraft 20, and for taking aerial photographs of a target point notified by the information processing apparatus 30. As the second camera 24, for example, a camera having a certain angle of view or an omnidirectional camera can be employed. In the present embodiment, the second unmanned aircraft 20 can navigate around the obstacles detected using the second camera 24. The second camera 24 is a camera that provides higher obstacle detection accuracy than the first camera 14 mounted on the first unmanned aircraft 10. Specifically, the second camera 24 may have, for example, a higher resolution, a larger image sensor, a smaller f-number for lenses, or a larger number of lenses than the first camera 14 mounted on the first unmanned aircraft 10. In a case in which the first camera 14 mounted on the first unmanned aircraft 10 is equipped with a CCD image sensor, the second camera 24 may be equipped with a CMOS image sensor. In the present embodiment, an obstacle that cannot be detected using the first camera 14 of the first unmanned aircraft 10 may be detected using the second camera 24 of the second unmanned aircraft 20.

(Configuration of Information Processing Apparatus)

Figure 4:
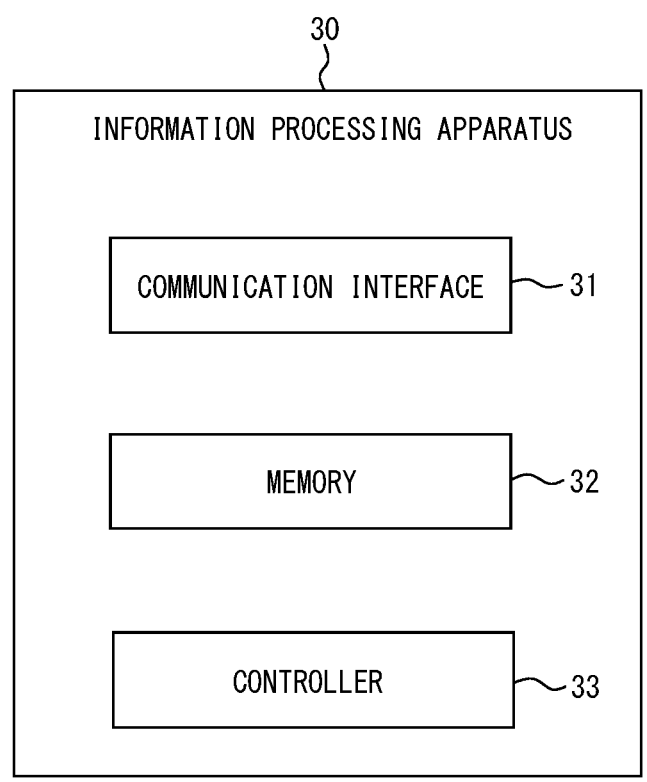
FIG. 4 is a block diagram illustrating a schematic configuration of an information processing apparatus.

As illustrated in FIG. 4, the information processing apparatus 30 includes a communication interface 31, a memory 32, and a controller 33.

The communication interface 31 includes at least one communication interface for connecting to the network 40. The communication interface is compliant with a wired local area network (LAN) standard or a wireless LAN standard, for example, but not limited to these, and may be compliant with any communication standard. In the present embodiment, the information processing apparatus 30 communicates with the first unmanned aircraft 10 and the second unmanned aircraft 20 via the communication interface 31.

The memory 32 includes one or more memories. The memories included in the memory 32 may each function as, for example, a main memory, an auxiliary memory, or a cache memory. The memory 32 stores any information used for operations of the information processing apparatus 30. For example, the memory 32 may store a system program, an application program, a database, map information, and the like. The information stored in the memory 32 may be updated with, for example, information acquired from the network 40 via the communication interface 31.

The controller 33 includes at least one processor, at least one programmable circuit, at least one dedicated circuit, or a combination of these. The controller 33 controls the operations of the entire information processing apparatus 30. Details of the operations of the information processing apparatus 30 controlled by the controller 33 will be described later.

(Flow of Operations of Information Processing Apparatus)

Figure 5:
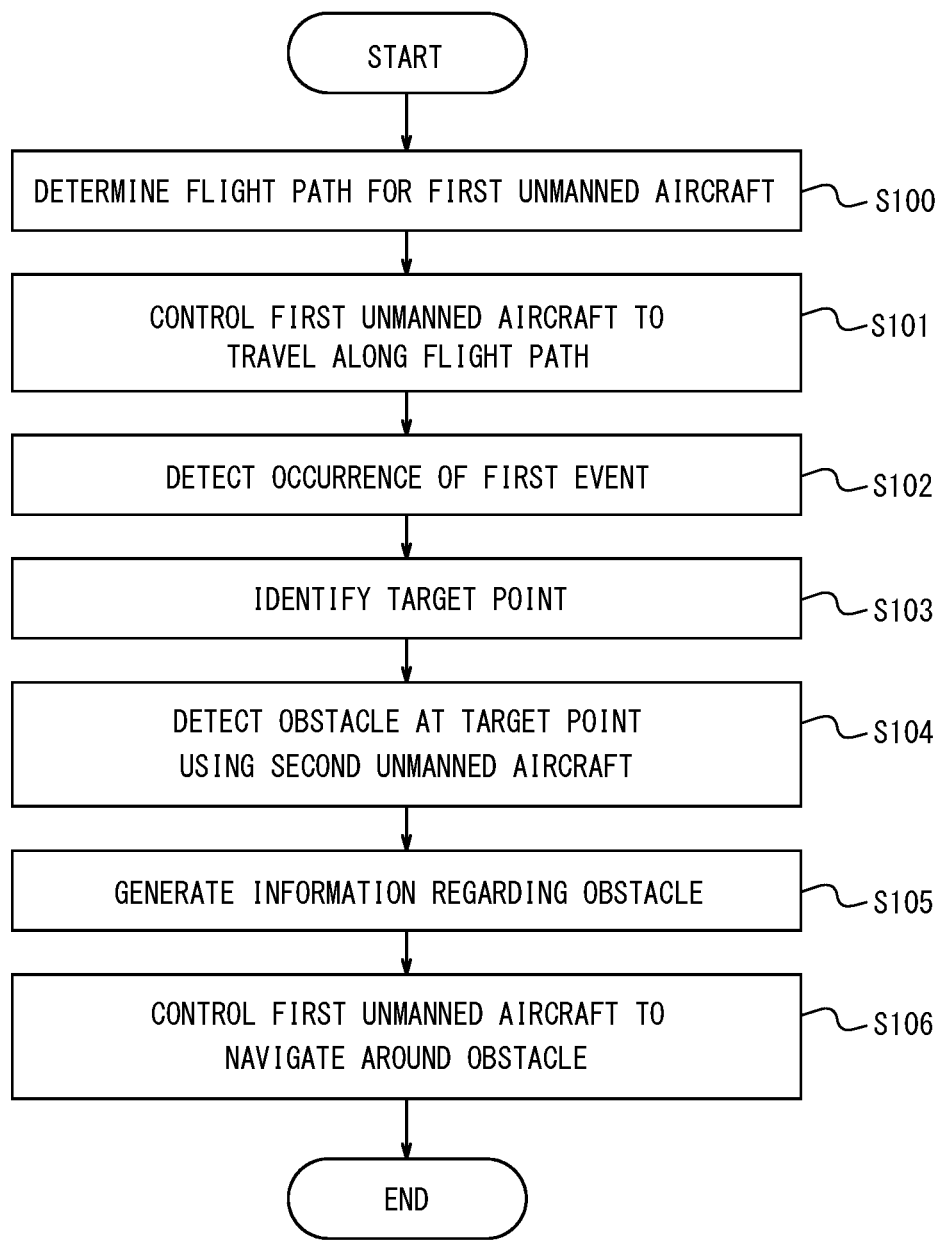
FIG. 5 is a flowchart illustrating operations of the information processing apparatus according to a first embodiment.

Operations of the information processing apparatus 30 according to the first embodiment will be described with reference to FIG. 5.

Step S100: The controller 33 determines a flight path along which the first unmanned aircraft 10 travels to a destination.

Specifically, the controller 33 acquires position information for the first unmanned aircraft 10 and information indicating a delivery destination of a package to be delivered by the first unmanned aircraft 10. The position information for the first unmanned aircraft 10 may be received from the first unmanned aircraft 10 via the communication interface 31, may be acquired from an operation plan for the first unmanned aircraft 10 stored in the memory 32, or may be inputted by an operator, for example. The information indicating the delivery destination of the package may be acquired from the operation plan for the first unmanned aircraft 10 stored in the memory 32, or may be inputted by the operator. The controller 33 determines a flight path in which a point indicated by the position information for the first unmanned aircraft 10 is the starting point and the delivery destination of the package is the destination.

Step S101: The controller 33 controls the first unmanned aircraft 10 to travel along the flight path.

Specifically, the controller 33 notifies the first unmanned aircraft 10 of the flight path determined in step S100. As described below, the first unmanned aircraft 10, upon receiving a notification of the flight path, begins traveling to the destination along the flight path. Here, the controller 33 may monitor position information for the first unmanned aircraft 10 while the first unmanned aircraft 10 is traveling along the flight path. Specifically, the controller 33 constantly acquires the position information from the first unmanned aircraft 10 via the communication interface 31.

Step S102: The controller 33 detects the occurrence of a predetermined event relating to the first unmanned aircraft 10. In the first embodiment, the predetermined event is a first event in which the first unmanned aircraft 10, in course of traveling along the flight path determined in step S100, stops traveling to the destination.

Figure 6:
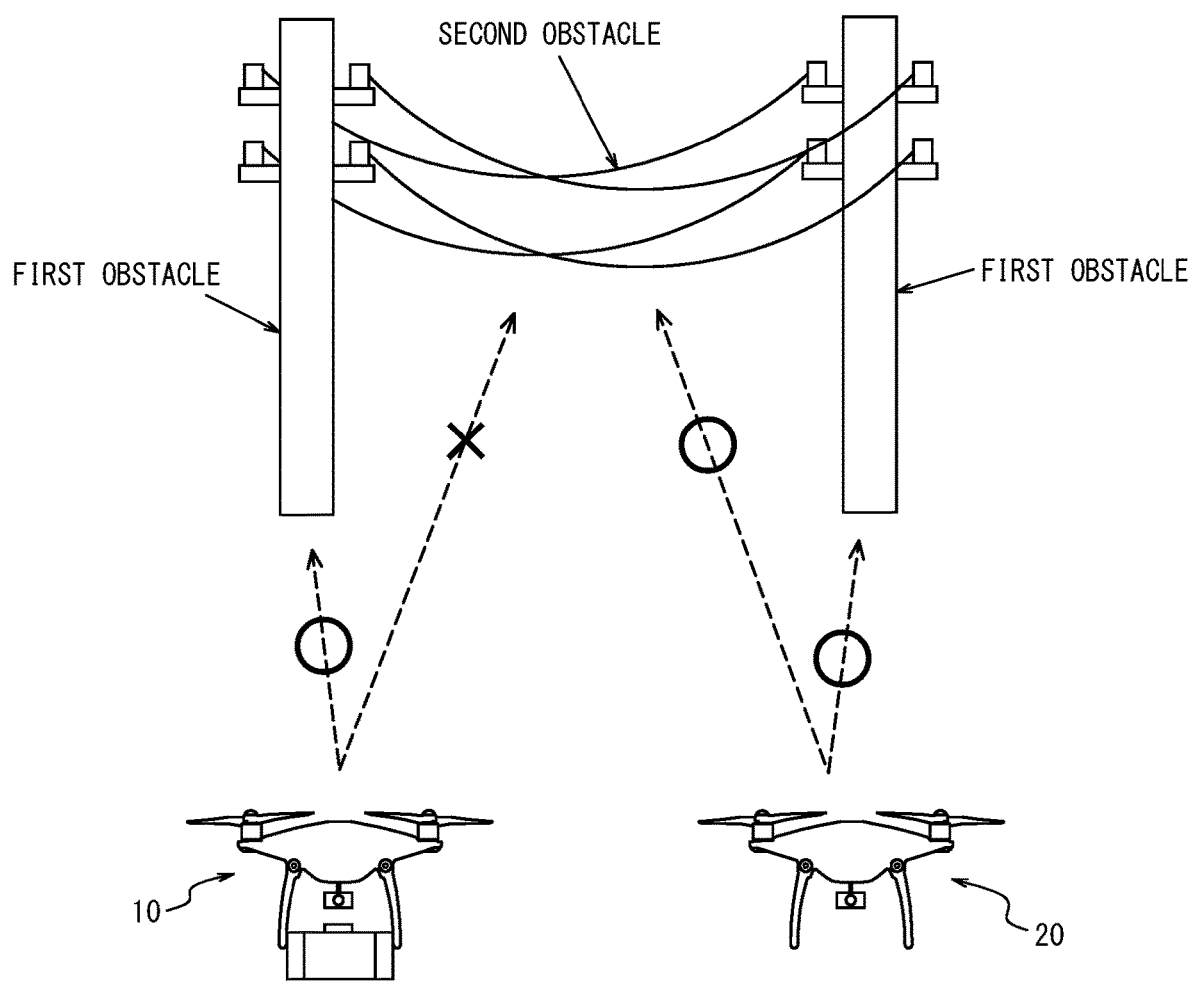
FIG. 6 is a diagram illustrating examples of first and second obstacles.

As described below, the first unmanned aircraft 10 stops traveling to the destination, in a case in which a first obstacle is detected using the first camera 14, whereas a second obstacle predetermined as another obstacle associated with the first obstacle is not detected. For example, as illustrated in FIG. 6, utility poles may be defined as first obstacles. In such a case, electric wires, which are likely to be present in the vicinity of the utility poles and are thinner and less visible than the utility poles, may be defined as second obstacles. The first camera 14, which provides low obstacle detection accuracy, cannot clearly capture images of the electric wires, which are thinner and less visible than the utility poles, and hence the electric wires cannot be necessarily detected from the images.

Any method can be employed to detect the occurrence of the first event. For example, based on change in the position information for the first unmanned aircraft 10, the controller 33 may detect the occurrence of the first event in a case in which the position information for the first unmanned aircraft 10 does not substantially change for a predetermined time period. Alternatively, the controller 33 may detect the occurrence of the first event upon receiving a notification of the occurrence of the first event from the first unmanned aircraft 10.

Step S103: The controller 33 identifies a target point on the flight path for the first unmanned aircraft 10. In the first embodiment, the target point is a point indicated by position information for the first unmanned aircraft 10 at the time of the occurrence of the first event, that is, a point at which the first unmanned aircraft 10 has stopped traveling to the destination.

Step S104: The controller 33 detects an obstacle at the target point using the second unmanned aircraft 20.

Specifically, the controller 33 notifies the second unmanned aircraft 20 of the target point. The notification of the target point may include information on a flight path in which the target point is the destination. In such a case, the controller 33 acquires position information for the second unmanned aircraft 20. The position information for the second unmanned aircraft 20 may be received from the second unmanned aircraft 20 via the communication interface 31, may be acquired from an operation plan for the second unmanned aircraft 20 stored in the memory 32, or may be inputted by an operator, for example. The controller 33 determines a flight path in which a point indicated by the position information for the second unmanned aircraft 20 is the starting point and the target point is the destination. As described below, the second unmanned aircraft 20, upon receiving a notification of the flight path, moves along the flight path to the target point, generates a plurality of images of the target point captured by the second camera 24, while changing a viewpoint in midair, and transmits the plurality of images to the information processing apparatus 30.

The controller 33 detects an obstacle at the target point based on the plurality of images received from the second unmanned aircraft 20. The obstacle at the target point includes at least a second obstacle. In other words, the controller 33 detects at least a second obstacle from the plurality of images. In such a case, the controller 33 may selectively detect only a second obstacle from the plurality of images. For example, as illustrated in FIG. 6, electric wires, which are second obstacles that have not been detected by the first camera 14 of the first unmanned aircraft 10, may be detected from the plurality of images generated using the second camera 24 of the second unmanned aircraft 20. Utility poles, which are first obstacles, may also be detected from the plurality of images generated using the second camera 24.

Step S105: The controller 33 generates information regarding the obstacle detected using the second unmanned aircraft 20.

Specifically, the controller 33 generates information regarding the obstacle by performing, for example, a three-dimensional survey using the plurality of images of the target point received from the second unmanned aircraft 20. In the example illustrated in FIG. 6, the controller 33 generates information regarding at least the electric wires, which are the second obstacles. In the first embodiment, the information regarding the obstacle includes at least coordinate data for the obstacle. The coordinate data for the obstacle may be two-dimensional or three-dimensional coordinate data for a point representative of the position of the obstacle, or point cloud data including two-dimensional or three-dimensional coordinate data for a plurality of points. Alternatively, the information regarding the obstacle may be two-dimensional or three-dimensional topographical data for the entire target point. The topographical data for the entire target point includes coordinate data for the obstacle.

Step S106: The controller 33 controls the first unmanned aircraft 10 to navigate around the obstacle, using the information regarding the obstacle generated in step S105.

Specifically, the controller 33 transmits the information regarding the obstacle to the first unmanned aircraft 10. As described below, the first unmanned aircraft 10, upon receiving the information regarding the obstacle, recognizes the obstacle present in the vicinity of the first unmanned aircraft 10 itself based on the coordinate data for the obstacle included in the information. In the example illustrated in FIG. 6, the first unmanned aircraft 10 recognizes the electric wires, which are the second obstacles that have not been detected using the first camera 14, based on coordinate data for the electric wires included in the information regarding the second obstacles. The first unmanned aircraft 10 navigates around the electric wires, which are the recognized second obstacles, to continue traveling to the destination.

(Flow of Operations of First Unmanned Aircraft)

Operations of the first unmanned aircraft 10 according to the first embodiment will be described with reference to FIG. 7.

Step S200: The controller 15 acquires a flight path to a destination. Specifically, the controller 15 receives a notification of a flight path from the information processing apparatus 30 via the communication interface 11.

Step S201: The first unmanned aircraft 10 begins traveling to the destination along the flight path under the control of the controller 15.

Specifically, the controller 15 controls the operation of the first unmanned aircraft 10 so that the first unmanned aircraft 10 begins traveling to the destination along the flight path acquired in step S200. While the first unmanned aircraft 10 is traveling along the flight path, the controller 15 may constantly transmit position information for the first unmanned aircraft 10 to the information processing apparatus 30 via the communication interface 11.

Step S202: The controller 15 detects the occurrence of a first event in which the first unmanned aircraft 10, in course of traveling along the flight path, stops traveling to the destination.

Specifically, the controller 15 stops traveling to the destination and detects the occurrence of a first event, in a case in which a first obstacle is detected using the first camera 14, whereas a second obstacle predetermined as another obstacle associated with the first obstacle is not detected. The stop of traveling may include the first unmanned aircraft 10 waiting in midair by hovering, circling, or the like, or the first unmanned aircraft 10 landing to wait on the ground.

Step S203: The controller 15 notifies the information processing apparatus 30 of the occurrence of the first event via the communication interface 11. Here, the controller 15 may notify the information processing apparatus 30 of position information for the first unmanned aircraft 10 at the time of the occurrence of the first event.

Step S204: The controller 15 receives information regarding an obstacle at a target point on the flight path, the obstacle being detected using the second unmanned aircraft 20.

As described above, in the first embodiment, the target point is a point indicated by position information for the first unmanned aircraft 10 at the time of the occurrence of the first event, that is, a point at which the first unmanned aircraft 10 has stopped traveling to the destination. The obstacle detected using the second unmanned aircraft 20 includes at least a second obstacle (electric wires in the example illustrated in FIG. 6). As described above, the information regarding the obstacle includes coordinate data for the obstacle.

Step S205: The first unmanned aircraft 10 navigates around the obstacle using the received information regarding the obstacle under the control of the controller 15. Specifically, the controller 15 controls the operation of the first unmanned aircraft 10 so that the first unmanned aircraft 10 navigates around the obstacle indicated by the coordinate data included in the information regarding the obstacle.

Step S206: The first unmanned aircraft 10 continues traveling to the destination along the flight path under the control of the controller 15. Specifically, the controller 15 controls the operation of the first unmanned aircraft 10 so that the first unmanned aircraft 10 continues traveling to the destination along the flight path.

(Flow of Operations of Second Unmanned Aircraft)

Operations of the second unmanned aircraft 20 according to the first embodiment will be described with reference to FIG. 8.

Step S300: In a case in which a first event in which the first unmanned aircraft 10, in course of traveling along a flight path to a destination, stops traveling to the destination has occurred, the controller 25 receives a notification of a target point transmitted from the information processing apparatus 30 via the communication interface 21.

As described above, the target point is a point on the flight path for the first unmanned aircraft 10, the point being indicated by position information for the first unmanned aircraft 10 at the time of the occurrence of the first event. The notification of the target point may include information on a flight path in which the target point is the destination.

Step S301: The second unmanned aircraft 20 moves to the target point under the control of the controller 25. Specifically, the controller 25 controls the operation of the second unmanned aircraft 20 so that the second unmanned aircraft 20 moves to the target point along the flight path in which the target point is the destination. The flight path may be determined by the controller 25, or may be acquired from the notification of the target point received in step S300.

Step S302: The controller 25 generates a plurality of images of the target point captured by the second camera 24, while changing a viewpoint.

Step S303: The controller 25 transmits the plurality of images generated in step S302 to the information processing apparatus 30 via the communication interface 21. As described above, the transmitted plurality of images is used by the information processing apparatus 30 to perform a three-dimensional survey.

As described above, in a case in which a predetermined event relating to the first unmanned aircraft 10 has occurred, the information processing apparatus 30 according to the first embodiment detects, using the second unmanned aircraft 20, an obstacle at a target point on a flight path along which the first unmanned aircraft 10 travels to a destination. In the first embodiment, the predetermined event is a first event in which the first unmanned aircraft 10, in course of traveling along the flight path, stops traveling to the destination. The information processing apparatus 30 controls the first unmanned aircraft 10 to navigate around the detected obstacle using information regarding the detected obstacle.

The first unmanned aircraft 10 may stop traveling to a destination, in a case in which an inconvenience such as the first camera 14, which provides relatively low obstacle detection accuracy, being unable to accurately detect an obstacle has occurred. In contrast, according to the first embodiment, the first unmanned aircraft 10 can navigate around an obstacle detected using the second unmanned aircraft 20 equipped with the second camera 24, which provides relatively high obstacle detection accuracy, using information regarding the detected obstacle, to continue traveling to a destination. This eliminates, for example, the need for mounting a high-performance camera, which provides high obstacle detection accuracy, on every first unmanned aircraft 10 for delivery of packages. In general, the higher the performance of a camera, the higher the cost or the larger the dimensions of the camera. Therefore, according to the first embodiment, technology for controlling unmanned aircraft is improved in that the first unmanned aircraft 10 can navigate around an obstacle with increased reliability while having reduced cost or size.

Second Embodiment

Next, a second embodiment of the present disclosure will be described. The hardware configurations of the system 1 according to the second embodiment are the same as those in the first embodiment, and thus descriptions thereof are omitted. In the first embodiment described above, the predetermined event relating to the first unmanned aircraft 10 is a first event, and the occurrence of the first event is detected while the first unmanned aircraft 10 is traveling to a destination along a flight path. In contrast, the second embodiment differs from the first embodiment in that the predetermined event relating to the first unmanned aircraft 10 is a second event, and in that the occurrence of the second event may be detected, for example, before the first unmanned aircraft 10 begins traveling to a destination.

The second event is an event in which a target point is detected on a flight path for the first unmanned aircraft 10. In contrast to the first embodiment described above, the target point in the second embodiment is any point on a map in a second area predetermined as another area having a larger number of obstacles than a first area. In detail, the second area is predetermined as an area that may have a larger number of first and second obstacles (e.g., utility poles and electric wires) than the first area. Any method can be employed to determine the first and second areas.

For example, the controller 33 of the information processing apparatus 30 may determine, based on position information for utility poles provided by an electric power company, an area in which the density of utility poles is less than a predetermined reference value as the first area, and an area in which the density is equal to or greater than the reference value as the second area.

For example, the controller 33 may determine the first area and the second area based on images of views outside one or more vehicles captured by the one or more vehicles and position information for the one or more vehicles. Specifically, the controller 33 acquires, from one or more vehicles, images of views outside the one or more vehicles and position information at the time of capturing the images in association with each other. The controller 33 determines whether utility poles are detected from the images acquired from the vehicles. The controller 33 may determine, for each area determined by any method, for example, an area in which the frequency of detecting utility poles from the images is less than a predetermined reference value as the first area, and an area in which the frequency is equal to or greater than the reference value as the second area. In more detail, in a case in which utility poles are detected from an m number of images out of an n number of images captured in an area, the controller 33 calculates the frequency of detecting utility poles from the images captured in the area as m/n. Then, using a reference value r, if m/n<r, the controller 33 determines the area as the first area. On the other hand, if r≤m/n, the controller 33 determines the area as the second area. However, the method of determining the first area and the second area using the images acquired from the vehicles is not limited to this example.

(Flow of Operations of Information Processing Apparatus)

Operations of the information processing apparatus 30 according to the second embodiment will be described with reference to FIG. 9. It is assumed that information on the first area and the second area described above is stored in the memory 32 of the information processing apparatus 30.

Step S400: The controller 33 determines a flight path along which the first unmanned aircraft 10 travels to a destination. This step is the same as step S100 according to the first embodiment.

Step S401: The controller 33 determines whether a target point (i.e., a point in the second area) is present on the flight path for the first unmanned aircraft 10.

Step S402: The controller 33 detects the occurrence of a second event in which a target point is detected on the flight path for the first unmanned aircraft 10. Specifically, in a case in which a target point is determined to be present on the flight path in step S401, the controller 33 detects the occurrence of a second event.

Step S403: The controller 33 detects, using the second unmanned aircraft 20, an obstacle at the target point on the flight path for the first unmanned aircraft 10. This step is the same as step S104 according to the first embodiment.

Step S404: The controller 33 generates information regarding the obstacle detected using the second unmanned aircraft 20. This step is the same as step S105 according to the first embodiment.

Step S405: The controller 33 controls the first unmanned aircraft 10 to navigate around the obstacle, by modifying the flight path for the first unmanned aircraft 10 determined in step S400, using the information regarding the obstacle generated in step S404. In other words, the controller 33 modifies the flight path for the first unmanned aircraft 10 using the information regarding the obstacle, so that the first unmanned aircraft 10 navigates around the obstacle.

As described above, in a case in which a predetermined event relating to the first unmanned aircraft 10 has occurred, the information processing apparatus 30 according to the second embodiment detects, using the second unmanned aircraft 20, an obstacle at a target point on a flight path along which the first unmanned aircraft 10 travels to a destination. In the second embodiment, the predetermined event is a second event in which the target point is detected on the flight path for the first unmanned aircraft 10. The information processing apparatus 30 controls the first unmanned aircraft 10 to navigate around the detected obstacle by modifying the flight path for the first unmanned aircraft 10 using information regarding the detected obstacle.

According to the second embodiment, just as with the first embodiment described above, technology for controlling unmanned aircraft is improved in that the first unmanned aircraft 10 can navigate around an obstacle with increased reliability while having reduced cost or size. In the first embodiment described above, an obstacle is detected using the second unmanned aircraft 20, after a first event in which the first unmanned aircraft 10, in course of traveling to a destination along a flight path, stops traveling to the destination occurs. In contrast, in the second embodiment, for example, an obstacle can be detected using the second unmanned aircraft 20, before the first unmanned aircraft 10 begins traveling to a destination. Therefore, according to the second embodiment, since the first unmanned aircraft 10 is less likely to stop traveling after beginning traveling to a destination, the time period required until the first unmanned aircraft 10 arrives at the destination may be reduced, as compared to the first embodiment.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the first unmanned aircraft 10 or the second unmanned aircraft 20 executes some or all of the operations that are executed by the information processing apparatus 30 in the embodiments described above can be implemented. Specifically, the first unmanned aircraft 10 or the second unmanned aircraft 20, instead of the information processing apparatus 30, may detect an obstacle using the first unmanned aircraft 10 or the second unmanned aircraft 20 and generate information regarding the detected obstacle.

An embodiment in which the configuration and operations of the information processing apparatus 30 are distributed to multiple information processing apparatuses that can communicate with each other can be implemented.

An example in which the information processing apparatus 30 generates information regarding an obstacle and transmits the information to the first unmanned aircraft 10 to thereby control the first unmanned aircraft 10 to navigate around the obstacle is described, in the above first embodiment. However, an embodiment in which the information processing apparatus 30 controls the first unmanned aircraft 10 to navigate around an obstacle via the second unmanned aircraft 20 can also be implemented. Specifically, in a case in which a first event has occurred, the information processing apparatus 30 notifies the second unmanned aircraft 20 of a target point at which the first unmanned aircraft 10 has stopped traveling to a destination. Upon arriving at the target point, the second unmanned aircraft 20 detects an obstacle at the target point using the second camera 24. The second unmanned aircraft 20 establishes a communication channel with the first unmanned aircraft 10 via a short-range wireless communication, such as Bluetooth® (Bluetooth is a registered trademark in Japan, other countries, or both) or Wi-Fi® (Wi-Fi is a registered trademark in Japan, other countries, or both), for example. The second unmanned aircraft 20 then temporarily controls the operation of the first unmanned aircraft 10 to cause the first unmanned aircraft 10 to navigate around the obstacle. According to such an embodiment, since the information processing apparatus 30 need not generate information regarding an obstacle (e.g., coordinate data for the obstacle), the processing load on the information processing apparatus 30 may be reduced.

In the first and second embodiments described above, the information processing apparatus 30 may accumulate information regarding an obstacle at a target point (e.g., topographical data for the target point) in the memory 32. In such a case, the information processing apparatus 30 transmits, to the first unmanned aircraft 10, information regarding an obstacle at a point that is present on a flight path for the first unmanned aircraft 10 and that is accumulated in the memory 32, together with information on the flight path. When the first unmanned aircraft 10, in course of traveling along the flight path, arrives at the point, the first unmanned aircraft 10 navigates around the obstacle at the point using the information regarding the obstacle.

Examples in which first obstacles are utility poles and second obstacles are electric wires are described, in the above first and second embodiments. However, the first and second obstacles are not limited to these examples. For example, a generally low visibility obstacle, such as a relatively thin string obstacle or a transparent obstacle, for example, may be determined as a second obstacle. An obstacle that is more visible than the second obstacle and that is likely to be present in the vicinity of the second obstacle may be determined as a first obstacle.

For example, an embodiment in which a general purpose unmanned aircraft and information processing apparatus function as the first unmanned aircraft 10, the second unmanned aircraft 20, and the information processing apparatus 30 according to each embodiment described above can also be implemented. Specifically, a program in which processes for realizing the functions of the first unmanned aircraft 10, the second unmanned aircraft 20, or the information processing apparatus 30 according to each of the above-described embodiments are written may be stored in a memory of the general purpose unmanned aircraft or information processing apparatus, and the program may be read and executed by a processor. Accordingly, the present disclosure can also be implemented as a program executable by a processor, or a non-transitory computer readable medium storing the program.

The invention claimed is:

1. An information processing apparatus comprising:
   a communication interface configured to communicate with a first unmanned aircraft having a first camera to be used for detecting an obstacle and a second unmanned aircraft having a second camera to be used for detecting an obstacle with higher detection accuracy than the first camera; and
   a controller configured to determine, based on position information for first obstacles, a second area in which a density of first obstacles is equal to or greater than a reference value, determine a flight path along which the first unmanned aircraft travels to a destination, detect, in a case that a target point in the second area is present on the flight path, a second obstacle at the target point using the second unmanned aircraft before the first unmanned aircraft begins traveling to the destination, the second obstacle being less visible than the first obstacle and present in the vicinity of the first obstacle, modify the flight path using information regarding the detected second obstacle so that the first unmanned aircraft navigates around the second obstacle, and notify the first unmanned aircraft of the modified flight path to cause the first unmanned aircraft to begin traveling to the destination along the modified flight path.

2. The information processing apparatus according to claim 1, wherein the information regarding the second obstacle detected using the second unmanned aircraft includes coordinate data for the detected second obstacle.

3. The information processing apparatus according to claim 1, wherein
   the first obstacle is a utility pole, and the second obstacle is an electric wire; and
   the controller is configured to determine the second area based on position information for utility poles provided by an electric power company.

4. The information processing apparatus according to claim 1, wherein the controller is configured to:
   acquire, from one or more vehicles, images of views outside the one or more vehicles and position information at a time of capturing the images in association with each other;
   determine, for each image, whether the first obstacle is detected from the image;
   calculate, for each area, a ratio of number of images from which the first obstacles is detected captured in the area to total number of images captured in the area as the density of the first obstacles; and
   determine each area in which the density of the first obstacles is less than the reference value as a first area and each area in which the density of the first obstacles is equal to or greater than the reference value as the second area.

5. A system comprising a second unmanned aircraft equipped with a second camera to be used for detecting an obstacle and an information processing apparatus, wherein
   the information apparatus is configured to determine, based on position information for first obstacles, a second area in which a density of first obstacles is equal to or greater than a reference value, and determine a flight path along which a first unmanned aircraft travels to a destination, the first unmanned aircraft equipped with a first camera to be used for detecting an obstacle with lower detection accuracy than the second camera;
   the second unmanned aircraft is configured to, in a case that a target point in the second area is present on the flight path, move to the target point, and generate a plurality of images of the target point captured by the second camera, while changing a viewpoint; and
   the information apparatus is configured to detect a second obstacle at the target point based on the plurality of images before the first unmanned aircraft begins traveling to the destination, the second obstacle being less visible than the first obstacle and present in the vicinity of the first obstacle, modify the flight path using information regarding the detected second obstacle so that the first unmanned aircraft navigates around the second obstacle, and notify the first unmanned aircraft of the modified flight path to cause the first unmanned aircraft to begin traveling to the destination along the modified flight path.

6. The system according to claim 5, wherein the information processing apparatus is configured to:
   acquire, from one or more vehicles, images of views outside the one or more vehicles and position information at a time of capturing the images in association with each other;
   determine, for each image, whether the first obstacle is detected from the image;
   calculate, for each area, a ratio of number of images from which the first obstacles is detected captured in the area to total number of images captured in the area as the density of the first obstacles; and
   determine each area in which the density of the first obstacles is less than the reference value as a first area and each area in which the density of the first obstacles is equal to or greater than the reference value as the second area.

7. A method performed by an information apparatus configured to communicate with a first unmanned aircraft having a first camera to be used for detecting an obstacle and a second unmanned aircraft having a second camera to be used for detecting an obstacle with higher detection accuracy than the first camera, the method comprising:

determining, based on position information for first obstacles, a second area in which a density of first obstacles is equal to or greater than a reference value;

determining a flight path along which the first unmanned aircraft travels to a destination;

detecting, in a case that a target point in the second area is present on the flight path, a second obstacle at the target point using the second unmanned aircraft before the first unmanned aircraft begins traveling to the destination, the second obstacle being less visible than the first obstacle and present in the vicinity of the first obstacle;

modifying the flight path using information regarding the detected second obstacle so that the first unmanned aircraft navigates around the second obstacle; and notifying the first unmanned aircraft of the modified flight path to cause the first unmanned aircraft to begin traveling to the destination along the modified flight path.

8. The method according to claim 7, wherein the method comprising:

acquiring, from one or more vehicles, images of views outside the one or more vehicles and position information at a time of capturing the images in association with each other;

determining, for each image, whether the first obstacle is detected from the image;

calculating, for each area, a ratio of number of images from which the first obstacles is detected captured in the area to total number of images captured in the area as the density of the first obstacles; and determining each area in which the density of the first obstacles is less than the reference value as a first area and each area in which the density of the first obstacles is equal to or greater than the reference value as the second area.

\* \* \* \* \*